June 13, 1961 H. J. EICHEL 2,988,461
ADHESIVE TAPE
Filed June 16, 1958
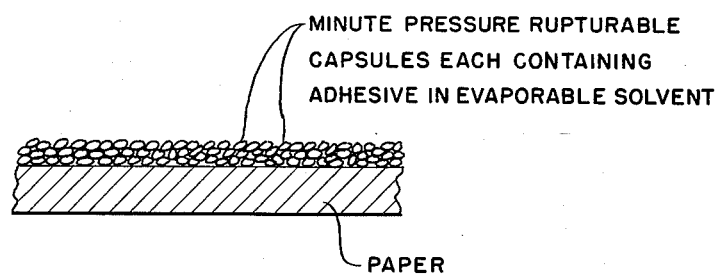
INVENTOR
HERMAN J. EICHEL
BY
HIS ATTORNEYS

2,988,461
ADHESIVE TAPE

Herman J. Eichel, Dayton, Ohio, assignor to The National Cash Register Company, Dayton, Ohio, a corporation of Maryland
Filed June 16, 1958, Ser. No. 742,003
1 Claim. (Cl. 117—122)

This invention relates to adhesive tape, and more particularly pertains to a film-like supporting web having a coating, on a surface thereof, including a profusion of microscopic pressure-rupturable capsules, each capsule containing an adhesive dissolved in a readily evaporable solvent.

The drawing shows a form of the invention comprising a paper web having a coating of minute pressure rupturable capsules each containing adhesive in evaporable solvent.

In use, the tape is applied to the receiving surface of the body to which the tape is to adhere, so the capsules are in contact therewith, pressure then being applied to the tape to rupture the capsules, thus releasing the dissolved adhesive which sets into a solid adhesive as the solvent is dissipated by evaporation or by absorption into the supporting tape or receiving body.

The supporting web may be, and preferably is, made of paper, but it may be made of any comparable film or web material such as degenerated cellulose, cellulose acetate, fabric woven from cotton, linen, or other fibrous material, and equivalents.

The microscopic capsule coating which is applied to the web support preferably is made by first preparing the adhesive solution which is contained inside the walls of the capsules by dissolving 35 parts, by weight, of chlorinated rubber of a viscosity, at room temperature (approximately 70° Fahrenheit) of 125 centipoises; 15 parts, by weight, of a polymerized rosin having a melting point of 208–217 degrees Fahrenheit; 20 parts, by weight, of hydro-abietyl phthalate; 20 parts by weight, of di-n-octyl-n-decyl phthalate; 15 parts, by weight, of chlorinated diphenyl having a specific gravity of 1.378–1.388; and 25 parts, by weight, of chlorinated diphenyl having a specific gravity of 1.740–1.745, in 50 parts, by weight, of diethylbenzene.

Next prepare, at 108 degrees Fahrenheit, a sol, consisting of 15 parts, by weight, of gelatin in 135 parts, by weight, of water, the sol being adjusted to pH 9 with a 10 percent aqueous solution of sodium hydroxide.

An emulsion is made of 135 parts, by weight, of the adhesive solution, as the inner phase, in the prepared sol, the emulsion being maintained at 108 degrees Fahrenheit. The emulsion is then diluted with 2230 milliliters of water at 108 degrees Fahrenheit.

To the diluted emulsion is added a sol of 15 parts, by weight, of gum arabic in 135 parts, by weight, of water, the gum arabic sol having previously been adjusted to pH 9 and heated to 108 degrees Fahrenheit to form a mixture. The mixture then is lowered to pH 4.6 by the addition of a 15 percent aqueous solution of acetic acid. Under these conditions the mixture undergoes coacervation, the gelatin and gum arabic molecules combining and depositing on the dispersed droplets of the adhesive solution, as seeding points, as a colloid-rich liquid capsular wall. Stirring is maintained during the coacervating and encapsulating procedure to assure the encapsulated droplets of adhesive liquid are kept discrete and to further assure that, while the coacervate mixture is still warm and the colloid ungelled, that the droplets will stay centered within the capsule walls.

Next gelation is brought about to cause the colloid walls to form solid walls around the droplets, said gelation being accomplished by cooling the coacervate mixture to 50 degrees Fahrenheit, or under. This results in microscopic capsules each with solid walls and a liquid center, all dispersed in a colloid-poor residual aqueous vehicle.

The capsules are hardened by introducing into the cooled and still stirred dispersion of capsules 7.5 grams of a 25 percent aqueous solution of glutaraldehyde, the hardening taking several hours with continued agitation.

Enough water is removed from the mixture of hardened capsules and residual water to make a fluid coating which may be conveniently applied to the tape on which it is allowed to dry.

This coated tape is prepared for application to the receiving medium by passing it through pressure rolls or subjecting it to a capsule-rupturing abrasion. The adhesive solution being freed by the rupture of the involved capsules will cause the tape to stick to the receiving medium to which it is applied, the adhesion of the tape to said receiving medium becoming of a permanent nature when the solvent escapes by evaporation or absorption into the surrounding materials or into the air.

The invention is not to be deemed limited to the particular adhesive, solvent, or encapsulating materials or techniques involved in the preferred embodiment, as the main feature is to provide an adhesive tape which is non-tacky, or non-adhesive until it is prepared by rupturing the potentially adhesive coating of microscopic capsules containing an adhesive dissolved in a readily evaporable vehicle.

What is claimed is:

A potentially adhesive tape including a supporting web having coated on a surface thereof a profusion of microscopic pressure-rupturable capsules, the coating being non-tacky and non-adhesive until the capsules are ruptured, the capsules each containing a droplet of liquid substantially consisting of, in parts by weight, (a) chlorinated rubber having a viscosity, at room temperature, of 125 centipoises _____ 35
(b) polymerized rosin having a melting point of 208–217 degrees Fahrenheit _____ 15
(c) hydroabietyl phthalate _____ 20
(d) di-n-octyl-n-decyl phthalate _____ 20
(e) chlorinated diphenyl having a specific gravity of 1.378–1.388 _____ 15
(f) chlorinated diphenyl having a specific gravity of 1.740–1.745 _____ 25
(g) diethylbenzene _____ 50

References Cited in the file of this patent

UNITED STATES PATENTS

| | | |
|---|---|---|
| 1,769,627 | Fischer | July 1, 1930 |
| 1,799,797 | Huempfner | Apr. 7, 1931 |
| 2,730,456 | Green et al. | Jan. 10, 1956 |
| 2,800,457 | Green et al. | July 23, 1957 |
| 2,907,682 | Eichel | Oct. 6, 1959 |

FOREIGN PATENTS

| | | |
|---|---|---|
| 456,471 | Great Britain | Nov. 10, 1936 |
| 571,322 | Great Britain | Aug. 20, 1945 |